Patented June 11, 1935

2,004,440

UNITED STATES PATENT OFFICE 2,004,440

PACKING ARRANGEMENT FOR ELECTRICAL MACHINES

August Kazenmaier, Friedrich Allendorff, and Anton Schmid, Stuttgart, Germany, assignors to Robert Bosch Aktiengesellschaft, Stuttgart, Germany Application October 28, 1932, Serial No. 640,114 In Germany November 10, 1931

5 Claims. (Cl. 286—5)

The present invention relates to a packing arrangement for electrical machines which are connected by a flange to the gear-box or other chamber of internal combustion engines containing a lubricant. It is designed principally to prevent the oil vapours evolving in the gear-box from penetrating through the bearing into the interior of the flanged electrical machine (e. g., a magneto or a lighting dynamo). At the same time, the invention affords the possibility of producing a cheap arrangement and one which requires little room. The known protective arrangements, such as stuffing boxes or labyrinth packings, can also prevent the penetration of oil or oil vapours into the interior of the machine. They are, however, not suitable in the present case, because if they are to be reliable they would occupy too much room, and be too expensive. The arrangement known in blowers or blowing apparatus of a pressure chamber between the parts of the casing to be separated is also incapable of use, because in the present case it would require a special pressure producer.

According to the present invention, a reliable and cheap protective arrangement which takes up only little room is produced by a chamber being arranged between the flanged bearing bracket of the electrical machine and the gear-box this chamber being sealed by packing against the gear-box and the electrical machine and communicating with the atmosphere.

Two examples of construction of the invention are shown in the accompanying drawings, in which.

Figure 2:
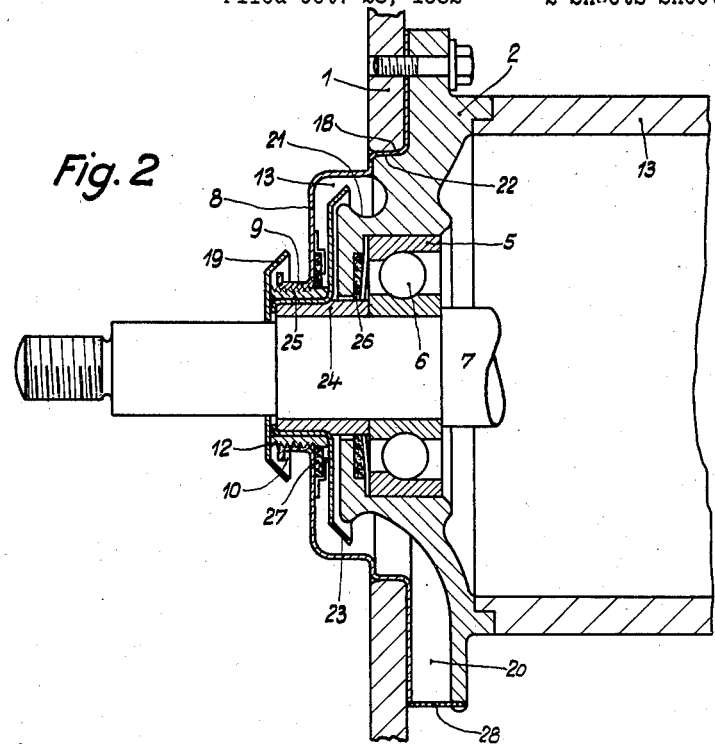
Figure 2 shows a second construction in section.
Figure 3:
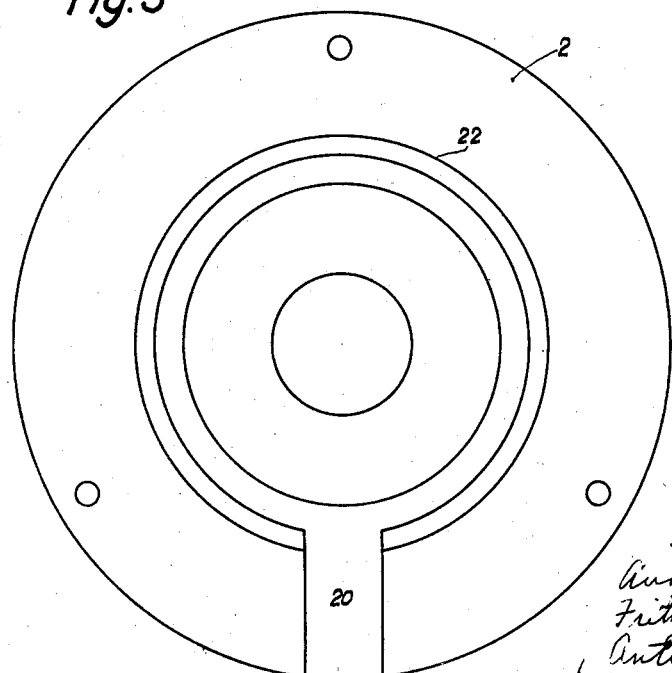

Figure 3 an elevation of the bearing cover shown in Figure 2.

Figure 1:
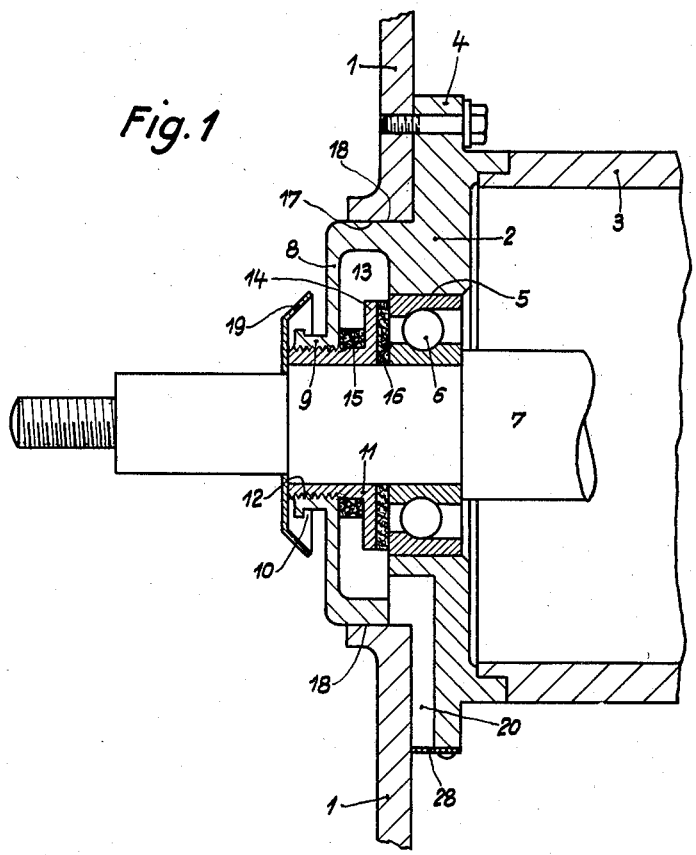
Figure 1 is a sectional view of a packing arrangement according to the invention.

Referring first to the construction shown in Fig. 1, the bearing cover 2, for example, of a lighting dynamo 3, is connected by means of a flange 4 to a wall 1 of the gear-box, for example, of an internal combustion engine. The cover has a bore 5 for the reception of a ball-bearing 6 for the armature shaft 7 of the lighting dynamo. On the cover 2 is cast a wall 8, which extends almost to the shaft, and together with the main wall, forms a chamber 13 annularly enclosing the shaft. The wall 8 has a cylindrical neck 9 surrounding the shaft, which neck is provided on its outer side with an oil discharge groove 10, in order to lead away the oil coming from a splash disc 19 mounted on the shaft. A bush 11 is inserted between the neck 9 and the armature shaft 7, and has on its part situated in the neck a thread 12 for returning to the gear box any oil which has penetrated between the bush and the neck. The bush 11 has a flange 14 projecting into the chamber 13. Between the flange 14 and the wall 8 and the ball bearing 5 felt rings 15 and 16 are respectively arranged. The wall 8 is provided with a cylindrical face 17 in order to centre the bearing cap in the bore 18 of the wall 1. The cap or cover 2 has also a recess 20, which forms a passage connecting the chamber 13 with the outer air.

The oil splashing all round in the gear-box 1 is kept off principally by the splash disc 19. The oil which, notwithstanding the splash disc, penetrates between the bush 11 and the neck 9 is conveyed back by the oil-conveying thread 12 into the gear-box. Furthermore, the felt rings 15 and 16 prevent a further creeping of the oil into the interior of the dynamo. The oil vapours which are not held back with certainty by the oil-conveying thread 12 and the felt ring 15 can freely escape from the chamber 13 through the passage 20 into the outer air.

In Figures 2 and 3 a second construction is shown, which differs from the first by the fact that the bearing bracket 2 and the wall 8 do not form one piece but consist of two parts. The bearing bracket on the outer side facing the gear-box is here carried over the ball-bearing up to the shaft, and provided with a groove 21 for catching oil. The wall 8 is in the form of a cup and is pressed out of sheet metal. The cup 8 has a cylindrical rim 22, the inner and outer faces of which are exactly machined so that the cup 8 fits snugly in the bore 18 of the gear-box 1, and the bearing bracket 2 in the cup 8. The inner rim of the cup 8 is extended as a neck 9 along the shaft 7, as in the first construction, and provided with a groove 10. The outer rim 22 of the cup is clamped between the wall 1 and the bearing cover 2.

Owing to the fact that the wall 8 forms a separate part, it is possible to arrange within the chamber 13 a second splash disc 23, the outer edge of which engages over the oil groove 21 on the bearing cap. The splash disc 23 is secured between a bush 24 shrunk on the shaft and a bush 25 pushed over it, which carries the oil-conveying thread 12 on its outer side. Between the ball-bearing 6 and the bearing cover 2 a felt ring 26 is arranged, and on the inner side of the cup 8 a felt ring 27.

The outlet opening of the passage 20 is protected by a sieve 28 against the penetration of dust.

We declare that what we claim is:

1. A packing arrangement for preventing the penetration of liquid-oil lubricant and vapors of said lubricant from a gear box into the casing of a machine of the type having a rotor shaft extending from the machine into the gear box for driving the machine, comprising an end cover structure for said machine having a wall portion disposed in said cover structure inwardly with respect to said machine, rotatably journalling said shaft and forming an end boundary wall of said machine, a flange adapting said cover structure to be attached to the wall of the gear box about the shaft, and an outer wall portion extending radially inward from said flange toward said shaft in such spaced relation with said first-mentioned wall portion as to form therewith a chamber in said cover structure about said shaft, said outer wall portion having a neck-like extension directed outwardly of said chamber in surrounding relation to said shaft and provided with an annular groove in its outer peripheral face, a rotatable splash ring on said shaft in proximity to said annular groove, means packing said chamber and said end boundary wall against said shaft, and conduit means formed in said cover structure opening said chamber to atmosphere at a point exterior to said gear box and said machine.

2. A packing arrangement for preventing the penetration of liquid-oil lubricant and vapors of said lubricant from a gear box into the casing of a machine of the type having a rotor shaft extending from the machine into the gear box for driving the machine, comprising the combination with a wall of the gear box having a bore of substantially larger diameter than said shaft, of an end bearing plate for said machine rotatably journalling said shaft and forming an end boundary wall of said machine, a flange on said bearing plate for connection to said wall of the gear box about the bore therein, and a pressed sheet metal cup engaging against said bearing plate, fitting into the bore in said wall of the gear box and centrally apertured for the passage of said shaft to form a chamber about said shaft between the interior of the gear box and said boundary wall of said machine, said metal cup and said bearing plate being cooperatively formed and arranged to open said chamber to atmosphere at a point exterior of said gear box and said machine.

3. A packing arrangement for preventing leakage of oil from an oil-containing casing having a shaft rotatable therein and extending therefrom, said packing arrangement comprising an end wall of said casing having a bore of greater diameter than said shaft and through which said shaft extends, a cover structure having a rim portion fitting in said bore and two walls extending from said rim portion in spaced relation radially inward toward said shaft to form a chamber in said cover structure about said shaft having an inner boundary wall facing the interior of said oil-containing casing and an outer boundary wall facing outwardly of said casing, an annular flange on said inner boundary wall directed axially inward of said oil-containing casing in surrounding proximity to said shaft and formed on its outer face with an oil-collecting groove, a splash ring on said shaft in said oil-containing casing in close proximity to said groove, means packing said chamber against said shaft and conduit means formed in said cover structure opening said chamber directly to atmosphere at a point in said cover structure radially outward of said chamber.

4. A packing arrangement for preventing leakage of oil from an oil-containing casing having a shaft rotatable therein and extending therefrom, said packing arrangement comprising an end wall of said casing having a bore of greater diameter than said shaft and through which said shaft extends, an end bearing plate over said bore rotatably journalling said shaft, said end bearing plate having a peripheral portion secured to the outer face of said end wall about said bore, a metal cup having a peripheral flange clamped between said peripheral portion of said end-bearing plate and said end wall of the oil-containing casing, said cup fitting into said bore in said casing and being centrally apertured for the passage of said shaft to form with said end bearing plate a chamber about said shaft between the interior of said oil-containing casing and said end-bearing plate, said metal cup and said bearing plate being cooperatively formed and arranged to open said chamber to atmosphere at a point on the peripheral edge of said plate, and means packing said chamber against said shaft.

5. A packing arrangement as defined in claim 4 and in which said cup is a pressed sheet metal cup.

AUGUST KAZENMAIER.
FRIEDRICH ALLENDORFF.
ANTON SCHMID.